March 17, 1964 G. MANNHEIM ETAL 3,125,167
EARTH WORKING TOOL RELEASE MECHANISM
Filed Jan. 9, 1963 2 Sheets-Sheet 1
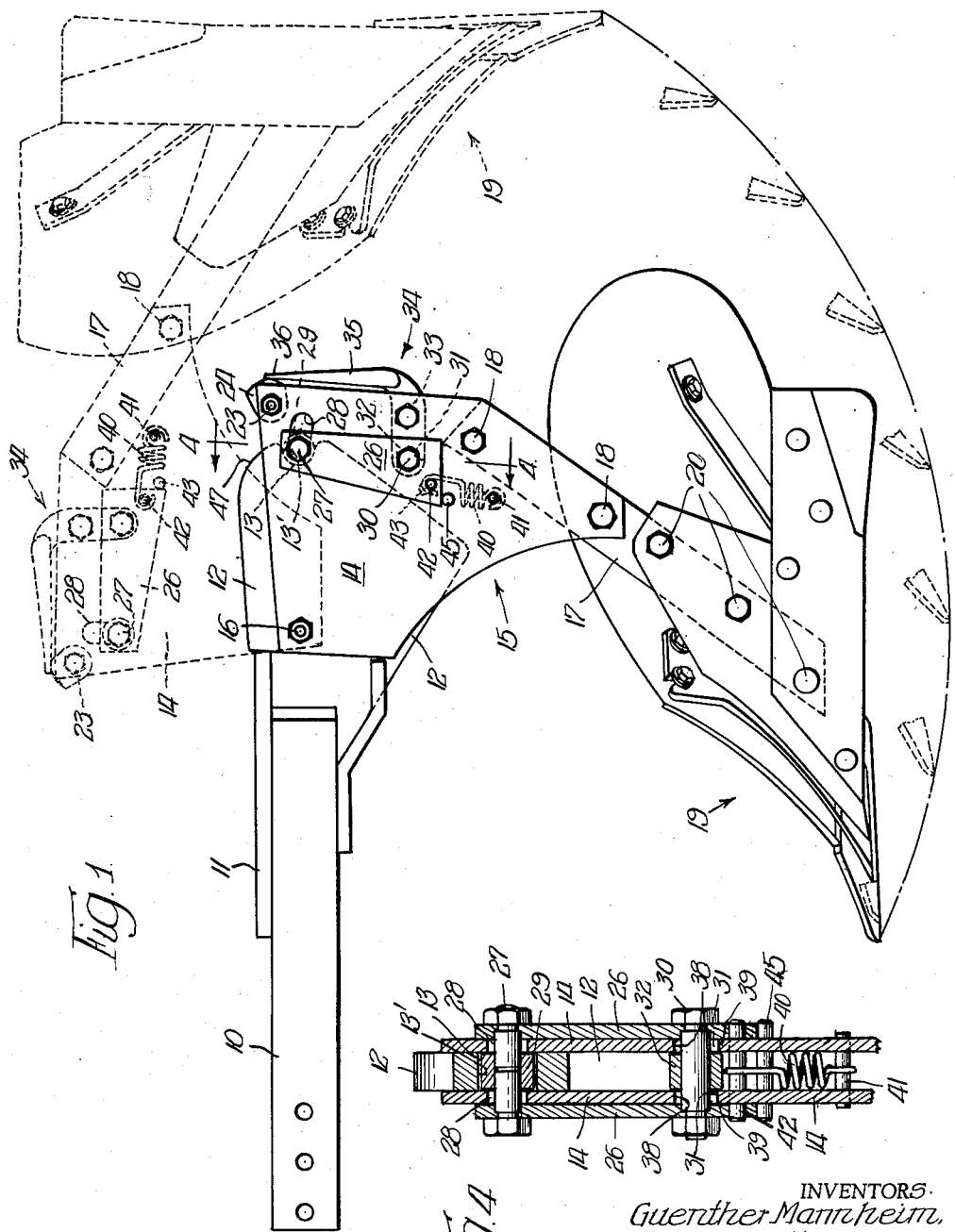
INVENTORS
Guenther Mannheim,
Earl D. Zeltwanger,
Donald E. Kuska,
By Cromwell, Greist & Warden
attys March 17, 1964 G. MANNHEIM ETAL 3,125,167
EARTH WORKING TOOL RELEASE MECHANISM
Filed Jan. 9, 1963 2 Sheets-Sheet 2
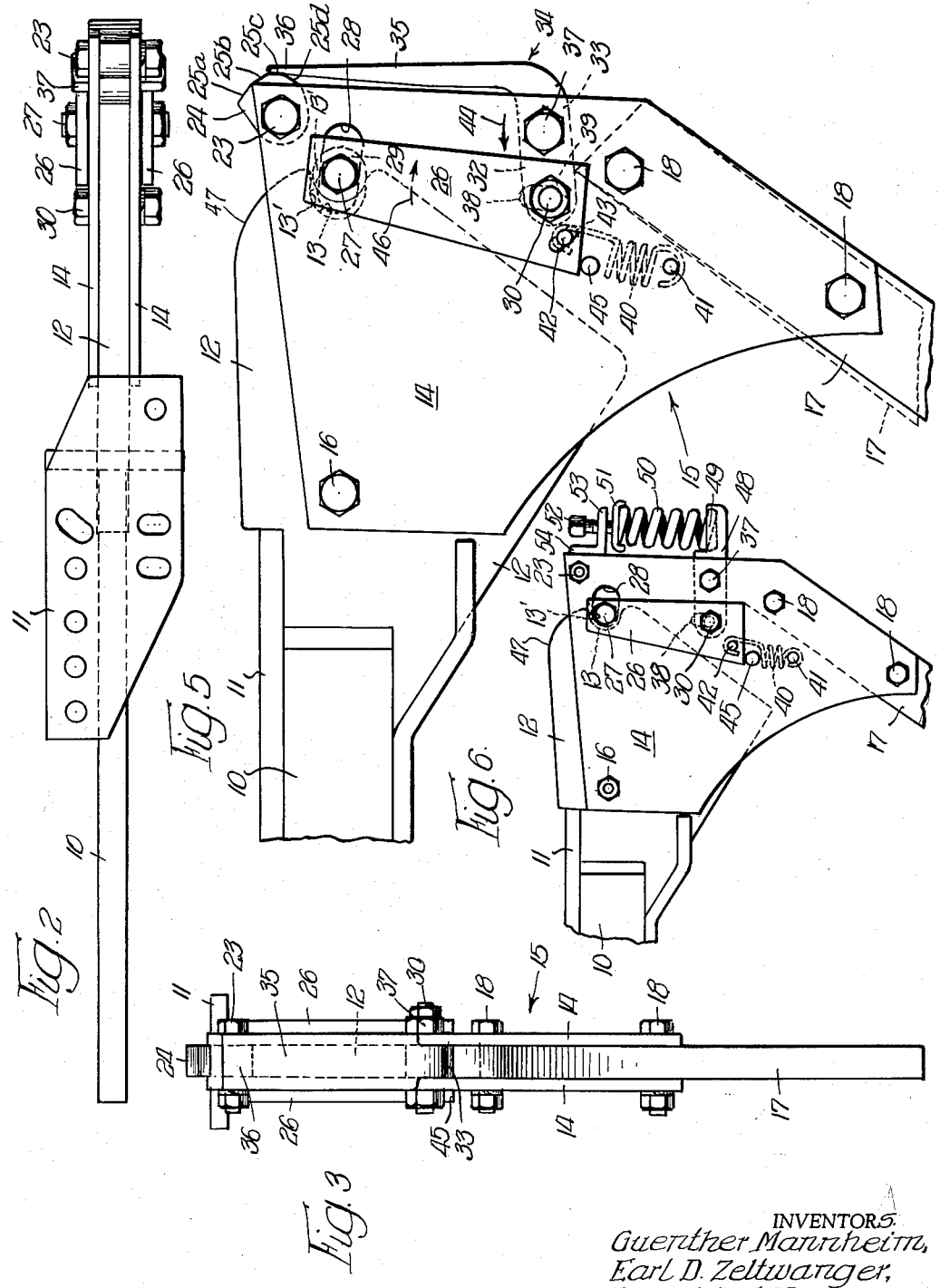
INVENTORS.
Guenther Mannheim,
Earl D. Zeltwanger,
Donald E. Kuska,
By Cromwell, Grist & Warden
ATTYS

United States Patent Office 3,125,167
Patented Mar. 17, 1964

3,125,167
EARTH WORKING TOOL RELEASE MECHANISM
Guenther Mannheim, South Bend, Earl D. Zeltwanger, Mishawaka, and Donald E. Kuska, South Bend, Ind., assignors to Oliver Corporation, Chicago, Ill., a corporation of Delaware
Filed Jan. 9, 1963, Ser. No. 250,256
8 Claims. (Cl. 172—269)

This invention relates, generally, to earth working apparatus and it has particular relation to the release of a plow bottom or like earth working tool in response to application thereto of a true overload.

Among the objects of this invention are: To provide in a new and improved manner for releasing a plow bottom from operative connection to a plow beam as a result of application to the plow bottom of a true overload; to mount the plow bottom on a frame that is pivotally attached to the plow beam which has a rearwardly opening socket and to interpose between the socket and the frame an L-shaped spring arranged to hold a detent in latching engagement in the socket under normal load conditions incident to moving the plow bottom through the earth free of relatively immovable obstructions; to mount the detent on a linkage pivotally connected to the short arm of the L-shaped spring with the distal end of its long arm reacting against the frame; to adjust the tension of the L-shaped spring by varying the position of the distal end of its long arm with respect to the frame; and to rotate the linkage to move the detent out of the socket as a result of opening the angle between the arms of the L-shaped spring caused by the plow bottom encountering a relatively immovable object.

In the drawings:

FIG. 1 is a view, in side elevation, of a conventional plow bottom carried by a frame that is pivotally mounted on a plow beam and provided with a release mechanism embodying this invention, the alternate or inoperative position of the plow bottom when released being shown by broken lines.

FIG. 2 is a top plan view of the plow beam and release mechanism shown in FIG. 1.

FIG. 3 is a view, in end elevation, of the release mechanism and beam foot on which the plow bottom is mounted.

FIG. 4 is a sectional view, at an enlarged scale, taken generally along the line 4—4 of FIG. 1.

FIG. 5 is a view, similar to FIG. 1, showing how the release mechanism functions to permit the plow bottom to swing to the inoperative position shown in FIG. 1 upon its encountering a relatively immovable object while it is being drawn through the earth, i.e., a so-called true overload.

FIG. 6 shows a modified construction.

In the drawings the reference character 10 designates a plow beam that is arranged to be drawn in a forward direction or from right to left as viewed in FIG. 1 by a tractor or the like. The plow beam 10 is in the form of a flat plate of steel and it has an overlying horizontal connection plate 11 secured thereto which permits connection to other similar plates for gang operation of a plurality of plow bottoms. At its right end the plow beam 10 has a widened flat end portion 12 and at the extreme right end thereof there is a socket or slot 13 opening endwise and extending generally horizontally with a downwardly facing upper side 13' that provides a reaction surface.

On opposite sides of the widened flat end portion 12 of the plow beam 10 are gusset plates 14—14 which together form a tool carrying frame that is indicated, generally, at 15. The gusset plates 14—14 or the tool carrying frame 15 are mounted by a pivot bolt 16 which extends therethrough and through the widened flat end portion 12 of the plow beam 10. The construction is such that the inner surfaces of the gusset plates 14—14 move freely over the juxtaposed outer surfaces of the widened flat end portion 12 of the plow beam 10. They extend downwardly and beyond the rear edge of the widened flat end portion 12 for receiving therebetween the upper end of a beam foot 17. Bolts 18—18 serve to mount the beam foot 17 between the gusset plates 14—14. At its lower end the beam foot 17 is connected to an earth working tool in the form of a plow bottom that is shown generally at 19 and is secured to the beam foot 17 by bolts 20-20. The construction is such that the plow bottom 19 secured to the lower end of the beam foot 17 can rotate with the tool carrying frame 15 formed by the gusset plates 14—14 about the horizontal axis through the pivot bolt 16. The normal operating position of the plow bottom 19 is shown by full lines in FIG. 1 while the showing by broken lines indicates the inoperative position to which the plow bottom 19 and parts rigidly movable therewith can be swung upon the plow bottom 19 encountering a relatively immovable object in the earth as it moves therethrough.

Extending through the upper right corners of the gusset plates 14—14 is a bolt 23 on which a cam 24 is positioned. The cam 24 is arranged to be clamped in fixed position on tightening of the bolt 23. As shown more clearly in FIG. 5 the cam 24 is provided with flat cam surfaces 25a–b–c–d that are eccentrically related with respect to the axis of rotation of the cam 24 on loosening of the bolt 23 for a purpose that will be apparent presently.

In order to hold the tool carrying frame 15 on which the beam foot 17 and plow bottom 19 are mounted in the operative position as shown in FIG. 1 a linkage comprising a pair of links 26—26 is employed. The links 26—26, as shown more clearly in FIG. 4, overlie opposite sides of the gusset plates 14—14. They are formed of flat metal plate material with a shoulder bolt 27 extending therethrough near their upper ends, it being noted that the links 26—26 extend generally vertically over the outer sides of the gusset plates 14—14. The shoulder bolt 30 functions to hold the links 26—26 in definite spaced relation to move freely over the outer surfaces of the gusset plates 14—14. The intermediate portions of the shoulder bolt 27 extend through upper arcuate clearance slots 28—28 that are formed in the gusset plates 14—14 and are positioned in alignment with the socket or slot 13 when the mechanism occupies the normal operative position shown in FIG. 1. A detent 29 in the form of a roller is carried by the central portion of the shoulder bolt 27 and it is positioned in the socket 13 and bears against the downwardly facing upper side 13' thereof for transmitting force thereto that is applied upwardly through the links 26—26 in a manner to be described. The width of the clearance slots 28—28 is such as to permit free relative movement of the shoulder bolt 27 and roller 29 relative to the gusset plates 14—14 which movement takes place when the plow bottom 19 encounters a relatively immovable obstruction.

At their lower ends as seen in FIG. 4 the links 26—26 are held in spaced apart relation and are joined by a shoulder bolt 30 which extends through lower slots 31—31 that are formed in the gusset plates 14—14 and extend generally normal to the upper slots 28—28.

The central portion of the shoulder bolt 30 extends through a distal end 32 of a short relatively rigid arm or lever 33 that forms a part of an L-shaped spring which is indicated, generally, at 34. The L-shaped spring 34 has a long arm 35 that is relatively flexible and, as shown in FIG. 3, is somewhat wider than the relatively rigid short arm 33. As shown in FIG. 5 the upper end 36 of the long arm 35 bears against one of the cam surfaces, i.e., the cam surface 25c on the cam 24. Since the cam surfaces 25a–b–c–d are located at different distances from the axis of rotation of the cam 24, the position of the upper end 36 of the long arm 35 can be spaced as desired from the tool carrying frame 15 to vary the tension of the L-shaped spring 34 at release of the plow bottom 19. It will be observed that the intermediate portion of the long arm 35 is free to flex and permit rotation of the distal end 32 of the short arm 33 about a pivot bolt 37 which extends through the short arm 33 intermediate its ends and through the gusset plates 14—14.

Under normal operating conditions with the plow bottom 19 latched in the operative position shown in FIG. 1 the intermediate portions of the shoulder bolt 30 are near the upper ends 38—38 of the lower slots 31—31 as seen in FIG. 4. In this position the intermediate portions of the shoulder bolt 30 are spaced somewhat above the lower ends 39—39 of the lower slots 31—31 and the roller detent 29 reacts against the downwardly facing upper side 13' of the socket 13. It will be understood that the normal force exerted by the plow bottom 19 as it moves through the earth is transmitted through the L-shaped spring 34 and the vertically extending links 26—26 to the detent roller 29 and thereby against the downwardly facing upper side 13' of the socket 13.

It is desirable that the linkage formed by the links 26—26 be biased in such a direction as to hold the roller detent 29 in operative position in the socket 13. For this purpose a coil tension spring 40 is employed and is located between the lower portions of the gusset plates 14—14 and above the upper end of the beam foot 17. The lower end of the coil tension spring 40 is anchored to a transverse pin 41 which extends between the gusset plates 14—14. The upper end of the spring 40 is anchored to a transverse pin 42 which extends through the lower ends of the links 26—26 and through a slot 43 in each of the gusset plates 14—14.

When a force is applied to the plow bottom 19 in excess of that normally encountered as for example when it engages a relatively immovable obstacle, the angle between the arms 33 and 35 of the L-shaped spring 34 is opened further and the relatively short arm 33 is rotated in a direction indicated by the arrow 44 about the pivot bolt 37 as seen in FIG. 5 while the intermediate portion of the long arm 35 flexes to permit such rotation. Such rotary movement of the short arm 33 is caused by the higher loading which is applied through the roller detent 29 to the links 26—26 in a downward direction to move the intermediate portions of the shoulder bolt 30, FIG. 4, away from the upper ends 38—38 of the lower slots 31—31 in the gusset plates 14—14. When this takes place, the under sides of the links 26—26 at their left ends as viewed in FIG. 5 engage a transversely extending abutment pin 45 which is mounted on the gusset plates 14—14. Because of this engagement the links 26—26 are rotated in the direction indicated by the arrow 46, FIG. 5, about a horizontal axis through the shoulder bolt 30 or the pivotal connection to the distal end 32 of the short arm 33. The roller detent 29 then moves out of engagement with the downwardly facing upper side 13' of the socket 13 as permitted by the upper arcuate slots 28—28. When the roller detent moves out of latching engagement with the socket 13, the continued application of excessive force to the plow bottom 19 causes it to rotate about the pivot bolt 16 to the position shown by broken lines in FIG. 1.

Immediately after the roller detent 29 moves out of latching engagement with the socket 13 the links 26—26 are swung against the relatively small force of the coil tension spring 40 thus releasing the forces in the L-shaped spring 34. It will return to its initial condition with the arms 33 and 35 relatively positioned as shown in FIG. 1 with the relative movement being arrested by engagement of the intermediate portions of the shoulder bolt 30 with the upper ends 38—38 of the slots 31—31. This is a snap action and causes a relatively loud noise which is sufficient to inform the operator that the plow bottom 19 has been released. The forward movement of the plow beam 10 continues with the plow bottom 19 swung rearwardly and upwardly and it passes harmlessly over the obstruction.

In order to reset the plow bottom 19 to its operative position shown by full lines in FIG. 1 the operator reverses the movement of the plow beam 10 by a suitable action for a few feet or the plow beam 10 is raised sufficiently far to permit the plow bottom 19 to swing forwardly and downwardly. During the resetting operation as the plow bottom 19 swings downwardly and forwardly, the roller detent 29 rides along curved surface 47 on the upper right corner of the widened flat end portion 12 of the plow beam 10 until it comes into alignment with the socket 13 whereupon it snaps into place therein. Since it is necessary to extend only the coil tension spring 40 in the resetting operation and since it exerts a relatively small force, the forces incident to the resetting of the plow bottom 19 are relatively small. If desired, the links 26—26 can be swung manually in the direction indicated by the arrow 46 in FIG. 5 for releasing the plow bottom 19 without requiring the application thereto of the true overload. This makes it possible to swing the beam foot 17 to a position where the removal and replacement of the plow bottom 19 are facilitated.

Again referring to FIG. 5 and to the release of the plow bottom 19 when it is subjected to a true overload, it will be observed that the broken line showing of the beam foot 17 corresponds to its position during normal operation. The full line showing of the beam foot 17 and parts connected thereto here indicates the position to which they are rotated on encountering a relatively immovable obstruction which causes the application of a true overload sufficient to effect the automatic release of the latch mechanism in the manner described.

It will be recalled that the cam 24 is provided with the cam surfaces 25a–b–c and d each of which is a different distance from the pivot axis of the cam 24 through the bolt 23. Any one of these cam surfaces can be placed into operative position with respect to the upper end 36 of the long arm 35 by loosening the bolt 23 and turning the cam 24 to the desired position. Then the bolt 23 is retightened. The eccentric positioning of the cam surfaces 25a–b–c and d permits various adjustments of the position of the long arm 35 of the L-shaped spring 34 with respect to its short arm 33. The further that the upper end 36 of the arm 35 is moved away from the frame 15 by rotation of the cam 24, the further will the L-shaped spring 34 be rotated about the pivot bolt 37. This causes the lower end of the links 26—26 to move further away from the abutment pin 45. It follows that the L-shaped spring 34 will be required to deflect further or the angle between the arms 33 and 35 will need to be further increased in order to unlatch the detent roller 29 from the socket 13. By this adjustment the force required to release the plow bottom is increased.

FIG. 6 shows a modified construction in which the L-shaped spring 34 is not used. Instead its short arm or lever 33 is replaced by a relatively rigid lever 48 that is pivotally mounted intermediate its ends by pivot bolt 37 extending between the gusset plates 14—14 which comprise the tool carrying frame 15. The shoulder bolt 30 extends through one end of the lever 33 and through the slots 31—31 in the gusset plates 14—14 in the manner previously described. At its other end the lever 33 is provided with a cup shaped seat 49 against which the lower end of a coil compression spring 50 reacts. The upper end of the spring 50 bears against an end cup 51 whose position is adjustable for adjusting the tension of the spring 50 by an adjusting screw 52. The adjusting screw 52 is threaded in an arm 53 that extends from a bracket 54 which is held in position between the gusset plates 14—14 by the bolt 23. The operation of this embodiment of the invention is the same as described hereinbefore when the L-shaped spring 34 is used and for this reason need not be repeated.

This application is a continuation-in-part of our copending application Serial No. 217,216, filed August 15, 1962.

It will be appreciated that certain changes of a detailed design nature may be made in the preferred embodiment of the invention described above and shown in the accompanying drawings without departing from the spirit and scope of the invention as defined in the appended claims.

What is claimed as new is:

1. In earth working tool means, in combination, a beam member arranged and adapted to be pulled endwise in a forward generally horizontal direction and having a rearwardly opening socket with a downwardly facing upper side, a tool carrying frame pivoted about a horizontal axis on said beam, an earth working tool secured to and depending from said frame, said earth working tool in operative position on being drawn through the earth having a force applied thereto and to said frame tending to rotate them upwardly about said axis to an inoperative position; and means for releasably holding said frame and earth working tool in said operative position on said beam member including a generally vertically extending linkage having a detent extending horizontally from its upper end and in said operative position bearing against said downwardly facing upper side of said socket, a relatively rigid lever pivotally mounted intermediate its ends on said frame, means pivotally mounting the lower end of said linkage on one end of said lever, and spring means interposed between the other end of said lever and said frame, the application of said earth working tool and thereby to said frame of a force sufficient to rotate said lever against the biasing force of said spring means rotating said linkage and moving said detent carried thereby out of engagement with said downwardly facing upper side of said socket whereupon said frame and said earth working tool are released from said operative position to swing to said inoperative position.

2. In earth working tool means, in combination, a beam member arranged and adapted to be pulled endwise in a forward generally horizontal direction and having a rearwardly opening socket with a downwardly facing upper side, a tool carrying frame pivoted about a horizontal axis on said beam, an earth working tool secured to and depending from said frame, said earth working tool in operative position on being drawn through the earth having a force applied thereto and to said frame tending to rotate them upwardly about said axis to an inoperative position; and means for releasably holding said frame and earth working tool in said operative position on said beam member including a generally vertically extending linkage having a detent extending horizontally from its upper end and in said operative position bearing against said downwardly facing upper side of said socket, a generally L-shaped spring having a relatively rigid short arm and a relatively flexible long arm, means pivotally mounting said short arm intermediate its ends on said frame, the distal end of said long arm reacting against said frame with the intermediate portion of said long arm free to flex and permit limited rotation of the distal end of said short arm about its pivot, an adjusting cam rotatably mounted on said frame and interposed between it and said distal end of said long arm and having a cam surface eccentric with respect to its axis of rotation for varying the position of said distal end of said long arm with respect to said frame and thereby the tension of said L-shaped spring, means pivotally mounting the lower end of said linkage on said distal end of said short arm, and means responsive to application to said earth working tool and thereby to said frame of a force sufficient to open the angle between said arms of said L-shaped spring for rotating said linkage and moving said detent carried thereby out of engagement with said downwardly facing upper side of said socket whereupon said frame and said earth working tool are released from said operative position to swing to said inoperative position.

3. In earth working tool means, in combination, a beam member arranged and adapted to be pulled endwise in a forward generally horizontal direction and having a rearwardly opening socket with a downwardly facing upper side, a tool carrying frame pivoted about a horizontal axis on said beam, an earth working tool secured to and depending from said frame, said earth working tool in operative position on being drawn through the earth having a force applied thereto and to said frame tending to rotate them upwardly about said axis to an inoperative position; and means for releasably holding said frame and earth working tool in said operative position on said beam member including a generally vertically extending linkage having a detent extending horizontally from its upper end and in said operative position bearing against said downwardly facing upper side of said socket, a generally L-shaped spring having a relatively rigid short arm and a relatively flexible long arm, means pivotally mounting said short arm intermediate its ends on said frame, the distal end of said long arm reacting against said frame with the intermediate portion of said long arm free to flex and permit limited rotation of the distal end of said short arm about its pivot, means pivotally mounting the lower end of said linkage on said distal end of said short arm, means on said frame limiting movement of said distal end of said short arm toward said downwardly facing upper side of said socket under the influence of said L-shaped spring, and abutment means on said frame cooperating with said linkage on application to said earth working tool and thereby to said frame of a force sufficient to open the angle between said arms of said L-shaped spring for rotating said linkage to move said detent carried thereby out of engagement with said downwardly facing upper side of said socket whereupon said frame and said earth working tool are released from said operative position to swing to said inoperative position.

4. In earth working tool means, in combination, a beam member arranged and adapted to be pulled endwise in a forward generally horizontal direction and having a rearwardly opening socket with a downwardly facing upper side, a tool carrying frame pivoted about a horizontal axis on said beam, an earth working tool secured to and depending from said frame, said earth working tool in operative position on being drawn through the earth having a force applied thereto and to said frame tending to rotate them upwardly about said axis to an inoperative position; and means for releasably holding said frame and earth working tool in said operative position on said beam member including a generally vertically extending linkage having a detent extending horizontally from its upper end and in said operative position bearing against said downwardly facing upper side of said socket, a generally L-shaped spring having a relatively rigid short arm and a relatively flexible long arm, means pivotally mounting said short arm intermediate its ends on said frame, the distal end of said long arm reacting against said frame with the intermediate portion of said long arm free to flex and permit limited rotation of the distal end of said short arm about its pivot, means pivotally mounting the lower end of said linkage on said distal end of said short arm, spring means reacting between said frame and said linkage and urging said detent into said socket, means on said frame limiting movement of said distal end of said short arm toward said downwardly facing upper side of said socket under the influence of said L-shaped spring, and abutment means on said frame cooperating with said linkage on application to said earth working tool and thereby to said frame of a force sufficient to open the angle between said arms of said L-shaped spring for rotating said linkage to move said detent carried thereby out of engagement with said downwardly facing upper side of said socket whereupon said frame and said earth working tool are released from said operative position to said inoperative position.

5. In earth working tool means, in combination, a beam member arranged and adapted to be pulled endwise in a forward generally horizontal direction and having a rearwardly opening socket with a downwardly facing upper side, a tool carrying frame pivoted about a horizontal axis on said beam and having an upper slot aligned with said socket and a lower slot extending generally normal thereto, an earth working tool secured to and depending from said frame, said earth working tool in operative position on being drawn through the earth having a force applied thereto and to said frame tending to rotate them upwardly about said axis to an inoperative position; and means for releasably holding said frame and earth working tool in said operative position on said beam member including a generally vertically extending linkage overlying said frame and having a detent extending horizontally from its upper end and movable in said upper slot and in said operative position bearing against said downwardly facing upper side of said socket, a generally L-shaped spring having a relatively rigid short arm and a relatively flexible long arm, means pivotally mounting said short arm intermediate its ends on said frame adjacent said lower slot, the distal end of said long arm reacting against said frame with the intermediate portion of said long arm free to flex and permit limited rotation of the distal end of said short arm about its pivot, pivot means mounting the lower end of said linkage on said distal end of said short arm and extending into said lower slot and bearing against the upper end thereof under the influence of said L-shaped spring, and abutment means on said frame cooperating with said linkage on application to said earth working tool and thereby to said frame of a force sufficient to open the angle between said arms of said L-shaped spring for rotating said linkage to move said detent carried thereby out of engagement with said downwardly facing upper side of said socket whereupon said frame and said earth working tool are released from said operative position to swing to said inoperative position.

6. In an earth working implement having a fore and aft support beam the rear portion of which is in the form of a vertical gusset bearing plate, a tool-carrying frame comprising a pair of interconnected gusset plates spaced apart so as to sandwich said vertical gusset bearing plate therebetween for continuous bearing support engagement therewith, means pivotally mounting said frame on a horizontal axis adjacent the upper forward portion thereof to said vertical gusset bearing plate at a locus adjacent the upper forward portion thereof, and an earth working tool mounted on and depending from said tool-carrying frame, said vertical gusset bearing plate having a rearwardly opening slot formed in the upper rear portion thereof, and said tool-carrying frame having a closed elongated upper slot which registers with said rearwardly opening slot when said earth working tool is in its normal working position and a closed lower slot extending generally normal to said upper slot, the improvement which comprises latching means for releasably holding said tool-carrying frame and earth working tool in normal earth working position, said latching means comprising, an upwardly extending linkage overlying said tool-carrying frame and including a detent carried by the upper end of said linkage and movable in said closed elongated upper slot and in its latching position bearing against an upper inner surface of said rearwardly opening slot, a generally L-shaped spring having a relatively rigid short arm and a relatively flexible long arm, means pivotally mounting said short arm intermediate its ends on said tool-carrying frame adjacent said closed lower slot, the distal end of said long arm reacting in engagement with said frame with the intermediate portion of the long arm free to flex and permit limited rotation of the distal end of said short arm about its pivot, pivot means mounting said linkage adjacent its lower end on said distal end of said short arm and extending into said closed lower slot and normally bearing against the upper end thereof under the influence of said L-shaped spring, and abutment means on said tool-carrying frame cooperating with said linkage on application to said earth working tool and thereby to said tool-carrying frame of a force sufficient to open the angle between said arms of said L-shaped spring for rotating said linkage on its pivot to move said detent out of latching engagement in said rearwardly opening slot whereupon said tool-carrying frame and said earth working tool are released from said normal earth working position and free to swing rearwardly and upwardly to an inoperative position.

7. In earth working tool means, in combination, a beam member arranged and adapted to be pulled endwise in a forward generally horizontal direction and having a rearwardly opening socket with a downwardly facing upper side, a tool carrying frame pivoted about a horizontal axis on said beam, an earth working tool secured to and depending from said frame, said earth working tool in operative position on being drawn through the earth having a force applied thereto and to said frame tending to rotate them upwardly about said axis to an inoperative position; and means for releasably holding said frame and earth working tool in said operative position on said beam member including a generally vertically extending linkage having a detent extending horizontally from its upper end and in said operative position bearing against said downwardly facing upper side of said socket, a generally L-shaped spring having a relatively rigid short arm and a relatively flexible long arm, means pivotally mounting said short arm intermediate its ends on said frame, the distal end of said long arm reacting against said frame with the intermediate portion of said long arm free to flex and permit limited rotation of the distal end of said short arm about its pivot, and means pivotally mounting the lower end of said linkage on said distal end of said short arm, the application to said earth working tool and thereby to said frame of a force sufficient to open the angle between said arms of said L-shaped spring rotating said linkage and moving said detent carried thereby out of engagement with said downwardly facing upper side of said socket whereupon said frame and said earth working tool are released from said operative position to swing to said inoperative position.

8. In earth working tool means, in combination, a beam member arranged and adapted to be pulled endwise in a forward generally horizontal direction and having a rearwardly opening socket with a downwardly facing upper side, a tool carrying frame pivoted about a horizontal axis on said beam, an earth working tool secured to and depending from said frame, said earth working tool in operative position on being drawn through the earth having a force applied thereto and to said frame tending to rotate them upwardly about said axis to an inoperative position; and means for releasably holding said frame and earth working tool in said operative position on said beam member including a generally vertically extending linkage having a detent extending horizontally from its upper end and in said operative position bearing against said downwardly facing upper side of said socket, a relatively rigid lever pivotally mounted intermediate its ends on said frame, means pivotally mounting the lower end of said linkage on one end of said lever, and a coil compression spring interposed between the other end of said lever and said frame, the application to said earth working tool and thereby to said frame of a force sufficient to rotate said lever against the biasing force of said coil compression spring rotating said linkage and moving said detent carried thereby out of engagement with said downwardly facing upper side of said socket whereupon said frame and said earth working tool are released from said operative position to swing to said inoperative position.

References Cited in the file of this patent

UNITED STATES PATENTS

| | | |
|---|---|---|
| 1,078,871 | Olson | Nov. 18, 1913 |
| 2,913,059 | Toland et al. | Nov. 17, 1959 |

FOREIGN PATENTS

| | | |
|---|---|---|
| 161,484 | Sweden | Nov. 26, 1957 |